United States Patent
Jo et al.

(10) Patent No.: US 12,144,362 B2
(45) Date of Patent: Nov. 19, 2024

(54) NITRITE SUBSTITUTE COMPRISING MIXTURE OF PLASMA-TREATED VEGETABLE AND EGG WHITE

(71) Applicants: SEOUL NATIONAL UNIVERSITY R&DB FOUNDATION, Seoul (KR); THE INDUSTRY & ACADEMIC COOPERATION IN CHUNGNAM NATIONAL UNIVERSITY (IAC), Daejeon (KR)

(72) Inventors: Cheorun Jo, Seoul (KR); Hyun Jung Lee, Suwon-si (KR); Ji Won Kim, Yuseong-gu (KR); Dong Jin Shin, Gwanak-gu (KR); Samooel Jung, Yuseong-gu (KR); Hae In Yong, Gwanak-gu (KR)

(73) Assignees: SEOUL NATIONAL UNIVERSITY R&DB FOUNDATION, Seoul (KR); THE INDUSTRY & ACADEMIC COOPERATION IN CHUNGNAM NATIONAL UNIVERSITY (IAC), Daejeon (KR)

( * ) Notice: Subject to any disclaimer, the term of this patent is extended or adjusted under 35 U.S.C. 154(b) by 661 days.

(21) Appl. No.: 17/433,962

(22) PCT Filed: Oct. 21, 2020

(86) PCT No.: PCT/KR2020/014434
§ 371 (c)(1),
(2) Date: Aug. 25, 2021

(87) PCT Pub. No.: WO2021/080328
PCT Pub. Date: Apr. 29, 2021

(65) Prior Publication Data
US 2022/0160005 A1  May 26, 2022

(30) Foreign Application Priority Data
Oct. 21, 2019 (KR) .................... 10-2019-0130823

(51) Int. Cl.
*A23L 15/00* (2016.01)
*A23L 5/30* (2016.01)
*A23L 19/00* (2016.01)

(52) U.S. Cl.
CPC ............. *A23L 15/00* (2016.08); *A23L 5/30* (2016.08); *A23L 19/00* (2016.08)

(58) Field of Classification Search
CPC ............ A23L 15/00; A23L 5/30; A23L 19/00
See application file for complete search history.

(56) References Cited

FOREIGN PATENT DOCUMENTS

| KR | 10-2011-0105426 A | 9/2011 |
| KR | 10-2015-0043585 A | 4/2015 |

(Continued)

OTHER PUBLICATIONS

KR 101854447 B1 machine translation (Year: 2018).*
(Continued)

*Primary Examiner* — Vera Stulii
(74) *Attorney, Agent, or Firm* — Kilpatrick Townsend & Stockton LLP

(57) ABSTRACT

Provided are a nitrite substitute including a mixture of plasma-treated vegetables and egg white, a food including the nitrite substitute, and a method of preparing a food, the method including mixing the nitrite substitute with raw materials of a food to prepare a food emulsion. Foods having added thereto the nitrite substitute may exhibit colors and effects similar to those in conventional foods without an unpleasant taste.

10 Claims, 9 Drawing Sheets

(56) References Cited

FOREIGN PATENT DOCUMENTS

| KR | 10-2015-0109261 A | 10/2015 |
|---|---|---|
| KR | 10-2015-0139274 A | 12/2015 |
| KR | 0-1854447 B1 | 5/2018 |

OTHER PUBLICATIONS

International Search Report and Written Opinion for PCT/KR2020/014434 dated Apr. 7, 2021, all pages.

Abeyrathne, N. S. "Use of lysozyme from chicken egg white as a nitrite replacer in an Italian-type chicken sausage." Functional Foods in Health and Disease, 2015; 5(9): 320-330.

Cho, Cheol-Hun, SNU R& DB Foundation, application No. 10-2019-013023 The nitrate displacing agent including the mixture of the albumen and the vegetable processing with plasma, Grant of Patent, Apr. 21, 2021, all pages (Machine Translated provided).

Kyung J. et al., Nitrite Sources for Cured Meat Products, LWT—Food Science and Technology, vol. 129, Jul. 2020, 109583, 9 pages. https://doi.org/10.1016/j.lwt.2020.109583.

Nawaz N. et al., Lysozyme and Its Application as Antibacterial Agent in Food Industry, Molecules 2022, 27, 6305, 18 pages. https://doi.org/10.3390/molecules27196305.

Choi D. et al., Comprehensive Review of Clean-Label Antimicrobials Used in Dairy Products, Compr Rev Food Sci Food Saf. 2024;23:e13263, 21 pages. https://doi.org/10.1111/1541-4337.13263.

\* cited by examiner

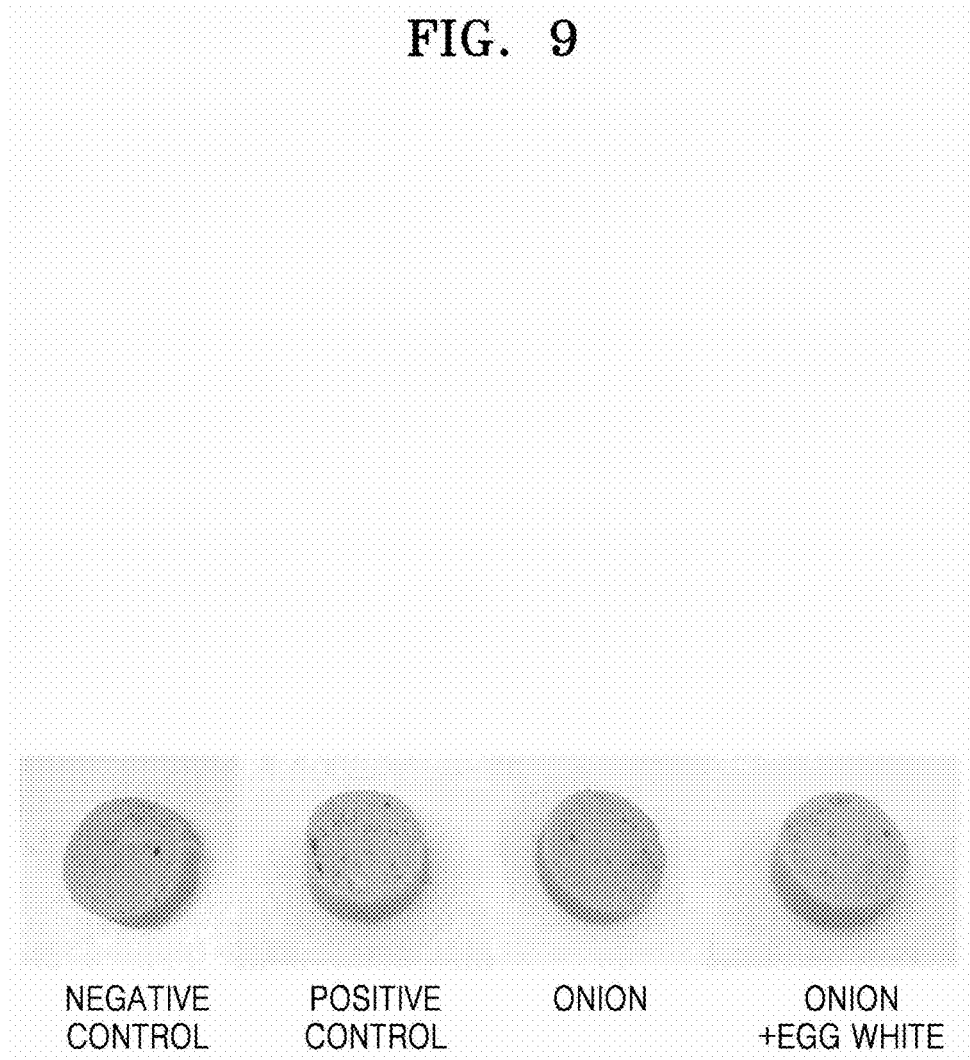

NITRITE SUBSTITUTE COMPRISING MIXTURE OF PLASMA-TREATED VEGETABLE AND EGG WHITE

TECHNICAL FIELD

The present disclosure relates to a nitrite substitute including a mixture of plasma-treated vegetables and egg white.

BACKGROUND ART

Nitrites, as one of the typical synthetic additives mostly used in the manufacture of meat products, not only suppresses rancidity during storage and helps develop a unique flavor and color of meat products, but also inhibits the proliferation of various aerobic and anaerobic microorganisms, and thus may enhance the storage properties of meat products. Also, nitrites may inhibit the proliferation of *Bacillus cereus, Staphylococcus aureus*, and *Clostridium perfringens*, which can produce toxic substances. As the only substances that may inactivate *Clostridium* botulinum in meat products, nitrites are known as additives that are difficult to replace when manufacturing meat products. In addition, nitrites are widely used as coloring agents and preservatives in foods such as fish meat sausage, cod roe, and salmon roe.

However, as consumer distrust of synthetic additives has intensified in recent years, natural materials that can replace synthetic nitrites are being developed. Technology for producing nitrites derived from natural products using fermentation microorganisms is also one of the representative synthetic nitrite replacement technologies. Still, the color and flavor peculiar to plant raw materials being used in this technology affect the organoleptic properties of processed meat products, and thus this method may be perceived negatively by consumers. Moreover, in terms economics, considerable cost and time are invested in the importation process of vegetable concentrate powder used as plant raw materials, microbial fermentation process, and strain management, and thus there is an opinion that the technology may not operate as a perfect alternative to the addition of synthetic nitrites.

Under this technical background, research on the addition of nitrites is being actively conducted (Korean Publication No. 10-2015-0043585), and yet it is still insufficient.

DESCRIPTION OF EMBODIMENTS

Technical Problem

Provided is a nitrite substitute including a mixture of plasma-treated vegetables and egg white.

Provided is a food including the nitrite substitute.

Provided is a method of preparing a food, the method including mixing the nitrite substitute with raw materials of food to prepare a food emulsion.

Solution to Problem

In the following description, certain specific details are set forth in order to provide a thorough understanding of various embodiments of the invention. However, one skilled in the art will understand that the invention may be practiced without these details.

Unless defined otherwise, all technical and scientific terms used herein have the same meaning as commonly understood by those of ordinary skill in the art to which the invention belongs. For the purposes of the present invention, the following terms are defined below.

The words "a" and "an" denote one or more, unless specifically noted.

By "about" is meant a quantity, level, value, number frequency, percentage, dimension, size, amount, weight, or length that varies by as much as 30, 25, 20, 15, 10, 9, 8, 7, 6, 5, 4, 3, 2, or 1% to a reference quantity, level, value, number, frequency, percentage, dimension, size, amount, weight, or length. In any embodiment discussed in the context of a numerical value used in conjunction with the term "about," it is specifically contemplated that the term about may be omitted.

Unless the context requires otherwise, throughout the present specification and claims, the word "comprise" and variations thereof, such as, "comprises" and "comprising" are to be construed in an open, inclusive sense, that is as "including, but not limited to".

By "consisting of" is meant including, and limited to, whatever follows the phrase "consisting of". Thus, the phrase "consisting of" indicates that the listed elements are required or mandatory, and that no other elements may be present.

A "decreased" or "reduced" or "lesser" amount is typically a "statistically significant" amount, and may include a decrease that is about 1.1, 1.2, 1.3, 1.4, 1.5, 1.6, 1.7, 1.8, 1.9, 2, 2.5, 3, 3.5, 4, 4.5, 5, 6, 7, 8, 9, 10, 15, 20, 30, 40, or 50 or more times lower (e.g., 100, 500, or 1000 times) an amount or level described herein. In particular embodiments, it indicates a decrease of at least 10%, at least 20%, at least 30%, at least 40%, at least 50%, at least 60%, at least 70%, at least 80%, or at least 90% (including all integers and decimal points in between, e.g., 15% or 26%) as compared to the reference amount.

An "increased" or "enhanced" amount is typically a "statistically significant" amount, and may include an increase that is 1.1, 1.2, 1.3, 1.4, 1.5, 1.6, 1.7, 1.8, 1.9, 2, 2.5, 3, 3.5, 4, 4.5, 5, 6, 7, 8, 9, 10, 15, 20, 30, 40, or 50 or more times greater (e.g., 100, 500, or 1000 times) (including all integers and decimal points in between and above 1, e.g., 2.1, 2.2, 2.3, or 2.4) an amount or level described herein. In particular embodiments, it indicates an increase of at least 10%, at least 20%, at least 30%, at least 40%, at least 50%, at least 60%, at least 70%, at least 80%, at least 90%, at least 100%, at least 150%, at least 200%, at least 500%, or at least 1000% (including all integers and decimal points in between, e.g., 15% or 26%) as compared to the reference amount.

According to an aspect of the present disclosure, provided is a nitrite substitute including a mixture of plasma-treated vegetables and egg white.

As used herein, the term "plasma treated group" may refer to a sample treated with plasma. The plasma treatment may preferably be performed while being exposed to the air instead of being sealed to produce nitrite ions from nitrogen in the air through the plasma treatment. In addition, since plasma techniques known in the art may be applied to the plasma treatment, a plasma generating device is not particularly limited, and thus air in the atmosphere may be used a discharge gas as well as using a dielectric barrier discharge, and various types of plasma such as corona discharge using a certain ratio of nitrogen and oxygen mixed gas, microwave discharge, and arc discharge may be used. That is, all plasmas capable of generating nitrogen monoxide and nitrogen dioxide may produce a plasma treated group including nitrite ions and nitrate ions. Also, the power supply unit for plasma generation may have various waveforms such as sine wave, square wave, and pulse wave, and the generation efficiency of the plasma treated group may be different depending on the driving frequency and the input voltage.

In addition, the plasma device used in the present invention is used for a particular preferred embodiment and is not limited to the plasma device used as described above. One of ordinary skill in the art to which the present invention pertains may perform the treatment using the structure of various plasma generators, the shape of an electrode, and the driving conditions.

Also, in the method of preparing meat products according to an embodiment of the present invention, the plasma treatment may be performed by corona discharge and dielectric barrier discharge with a strength in a range of about 0.1 to 5 kW, about 0.5 to 5 kW, about 1 to 5 kW, about 1.5 to 5 kW, about 2 to 4.5 kW, about 2.5 to 4.5 kW.

The plasma treatment may be performed for about 10 to 100 minutes, about 20 to 90 minutes, about 30 to 80 minutes, about 40 to 70 minutes, about 20 to 100 minutes, about 20 to 90 minutes, about 10 to 20 minutes, about 20 to 30 minutes, about 30 to 40 minutes, about 40 to 50 minutes, about 50 to 60 minutes, about 60 to 70 minutes, about 70 to 80 minutes, about 80 to 90 minutes, or about 90 to 100 minutes.

The plasma treatment conditions are limited to an embodiment, and the operation power and treatment time may be variously implemented. In other words, since the plasma generator has various electrical characteristics and plasma characteristics, the driving power and treatment time may vary depending on these characteristics, and an ion concentration of the plasma treated water is also determined according to the driving power and treatment time.

As used herein, the term "food" refers to a natural product or a processed product that contains one or more nutrients and does not contain harmful substances, and preferably means that the product is in a state that may be directly eaten through a certain degree of processing. The foods include confectionery, breads or rice cakes, frozen desserts, processed cocoa products or chocolates, sugars, jams, tofu or jelly, edible oils and fats, noodles, beverages, special purpose foods, sauces, seasoned foods, pickles or stewed foods, alcoholic beverages, agricultural products, egg processed products, dairy products, animal processed foods, honey and pollen processed products, ready-to-eat foods, and other foods. The food may be, preferably, processed meat products, packaged meats, processed fish meat products, and processed seafood products.

As used herein, the term "food emulsion" may refer to a composition before final cooking of food. This may mean a first pulverized raw material, a raw material added with various conventional food additives or the plasma treated group, or all compositions that appear in stages from the initial raw material to before the final food is completed. The food additives are materials commonly added in the process of food processing which may refer to fat, sodium chloride, sodium pyrophosphate, ascorbic acid, corn starch, soy protein, egg powder, sodium L-glutamate, sugar, collagen, sweeteners, preservatives, and species.

As used herein, the term "vegetables" refers to nutritious foods obtained from leaves, roots, seeds, or stems of plants, and may also be referred to as vegetables. The vegetables may include napa cabbage, cabbage, spinach, garland chrysanthemum, green onion, asparagus, bamboo shoots, celery, radish, carrot, potato, sweet potato, pumpkin, cucumber, tomato, watermelon, strawberry, melon, or eggplant, and may be, preferably, onion or garlic.

According to another aspect of the present disclosure, a weight ratio of the vegetables and egg white in the mixture may be in a range of about 10:1 to 1:1, and may be, preferable, about 8:1 to 1:1, 5:1 to 1:1, about 4:1 to 2:1, about 3.5:1 to 2:1, about 3.5:1 to 2.5:1, about 3:1 to about 2:1, about 3:1 to 2.5:1, and about 3.5:1 to about 3:1.

According to another aspect of the present disclosure, an amount of the mixture may be in a range of about 1 weight % to about 20 weight %, and may be, preferably, in a range of about 1 weight % to 15 weight %, about 1 weight % to about 10 weight %, about 1 weight % to about 8 weight %, about 2 weight % to about 7 weight %, about 3 weight % to about 6 weight %, about 4 weight % to about 5 weight %, about 1 weight % to about 4 weight %, about 2 weight % to about 3.5 weight %, about 3 weight % to about 4 weight %, about 2.5 weight % to about 4.5 weight %, based on a weight of the food. When the mixture is added in these ranges or lower, the effect of increasing the nitrite content is insignificant, and when the mixture is added above these weight ranges, the effect of increasing the nitrite content becomes excessive and may exceed the domestic standard (70 ppm) or more.

According to another aspect of the present disclosure, provide is a method of preparing a food, wherein the method includes performing the plasma treatment until a pH of a vegetables and egg white-treated group reaches 4 to 6. The pH may be in a range of about 4.5 to 6, about 5 to 6, about 4.5 to 5.5, about 5.2 to 5.8, about 5.3 to 5.7, or, preferably, about 5.4 to 5.6.

According to another aspect of the present disclosure, the method may include lyophilizing and then pulverizing the mixture or may further include mixing a mixture of the plasma-treated vegetables and egg white with raw materials of food to prepare a food emulsion; and then additionally cooking the food emulsion; and showering, cooling, and packaging the cooked product.

According to another aspect of the present disclosure, provided is a method of preparing a synthetic nitrite-free food.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

ADVANTAGEOUS EFFECTS OF DISCLOSURE

Foods including a nitrite substitute including a mixture of plasma-treated vegetables and egg white maintain a high residual nitrite concentration and may have the same level of color and preservation without addition of a synthetic nitrite.

BRIEF DESCRIPTION OF DRAWINGS

FIG. 9 shows a visual comparison of cross-sectional views of final food products.

MODE OF DISCLOSURE

Figure 1:
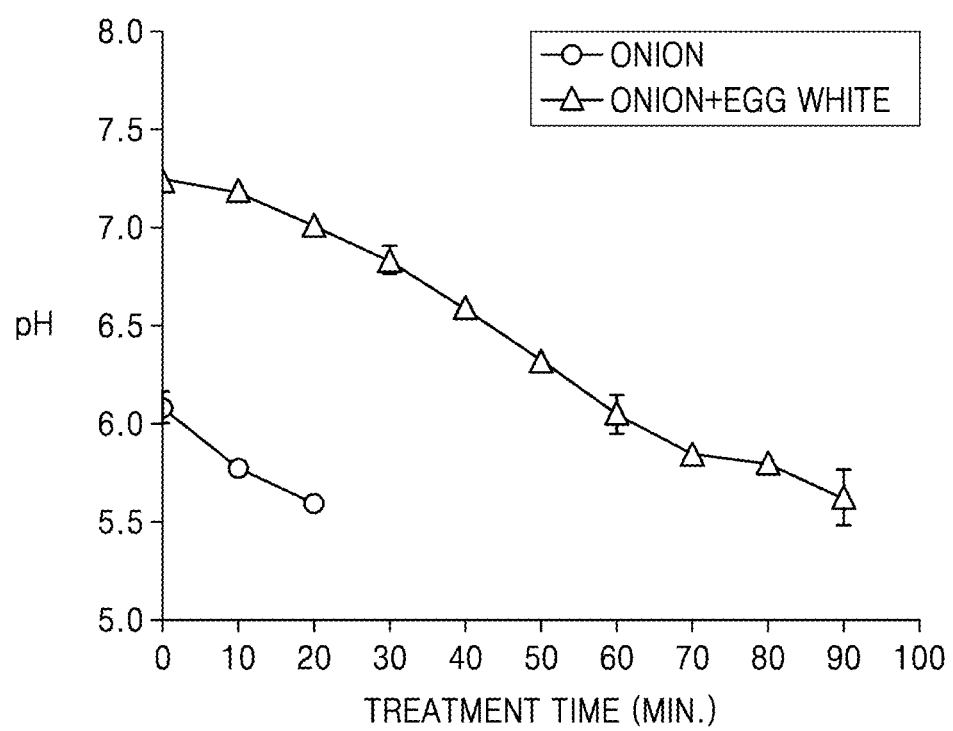
FIG. 1 shows pH changes of an onion treatment group and an onion+egg white treatment group according to plasma treatment.

Hereinafter, the present disclosure will be described in detail with reference to examples. However, the examples are only provided for illustrative purposes, but not to limit the scope of the present invention.

All experiments were repeated 3 times, and the analysis on the experimental results was performed by a one-way ANOVA variance analysis according togeneral linear model procedure of the SAS program (Version 9.4, SAS Institute Inc., NC, USA). Significance test (P<0.05) between the measured mean values was performed by a statistical analysis using a Tukey's multiple test, and the results were expressed as mean values and standard errors.

PREPARATION EXAMPLE

1. Preparation of Mixture of Plasma-Treated Onion, Garlic, and Egg White

After removing the skin, onions were washed with water and ground in a mixer to be used as a sample. After separating egg white from egg yolk in eggs, and the egg white was filtered once through a sieve to prepare two plasma treatment groups. One of the two plasma treatment groups was plasma-treated with only onions to prepare an onion treatment group, and the other sample was added with 30% by weight of egg white based on the weight of onion to prepare an onion and egg white treatment group. Each of the groups was plasma-treated at room temperature until the pH reached 5.5, where a conversion rate of the nitrite ions was less than 1%.

The above process was repeated for garlic to prepare a garlic treatment group and a garlic+egg white treatment group.

Each of the plasma treatment groups was lyophilized and pulverized to obtain a nitrite substitute to be used as a raw material of pork sausages. The nitrite substitute was stored in a vacuum-packed state at −20° C. in a dark room.

2. Preparation of Food

Pig hind leg and backfat of domestic refrigerated pork were each pulverized and used as food raw materials. While cutting 60 g of raw meat using a silent cutter (C4W, Sirman, Padova, Italy), 1.2 g of salt, 0.2 g of phosphate, and 0.02 g of ascorbic acid together with 20 g of fat and 20 g of ice water were added to prepare a sausage emulsion. Additionally, 3.1 g of the onion or garlic treatment group, which is a powdered nitrite substitute, or 3.1 g of the powdered onion or garlic+egg white treatment group were added to the sausage emulsion, and the resultant was filled in a collagen casing (25-mm diameter; NDX, Viscofan, Ceske Budejovice, Czech Republic). The prepared food emulsion was heated in a constant-temperature water bath until the core temperature reached 72° C. to be completed as a food.

A food prepared without adding anything was referred to as a negative control, and a food prepared by adding a synthetic nitrite was referred to as a positive control.

Experiment Example 1

Verification of pH of Plasma Treatment Group

In order to verify a pH of the plasma treatment group, the pH was measured as follows.

The pH measurement was performed by adding 9 mL of distilled water to 1 g of the sample and homogenizing the mixture at 9,600 rpm for 20 seconds using a homogenizer (T25 digital ULTRA-TURRAX®, Ika Co., Staufen, Germany), followed by filtration of the resultant, and a pH of the filtrate was measured using a pH meter (Seven 2Go, Mettler-Toledo Inc., Schwerzenbach, Switzerland).

As shown in FIG. 1, the pHs of the onion treatment group and the onion and egg white treatment group before the plasma treatment were 6.08 and 7.25, respectively, and the pHs decreased as the plasma treatment time increased. This is because when plasma is generated in the presence of moisture, active nitrogen species derived from the air react with water molecules and thus produce nitrite ions, thereby decreasing the pH. According to FIG. 1, the total plasma treatment time elapsed until the final pH reaches 5.5, which is the point at which a conversion ratio of nitrite ions to nitrate ions becomes 1% or less, is 20 minutes in the onion treatment group and 83.3 minutes in the onion+egg white treatment group, and it is deemed as due to the improvement of the pH buffering capacity caused by protein in the egg white.

Figure 2:
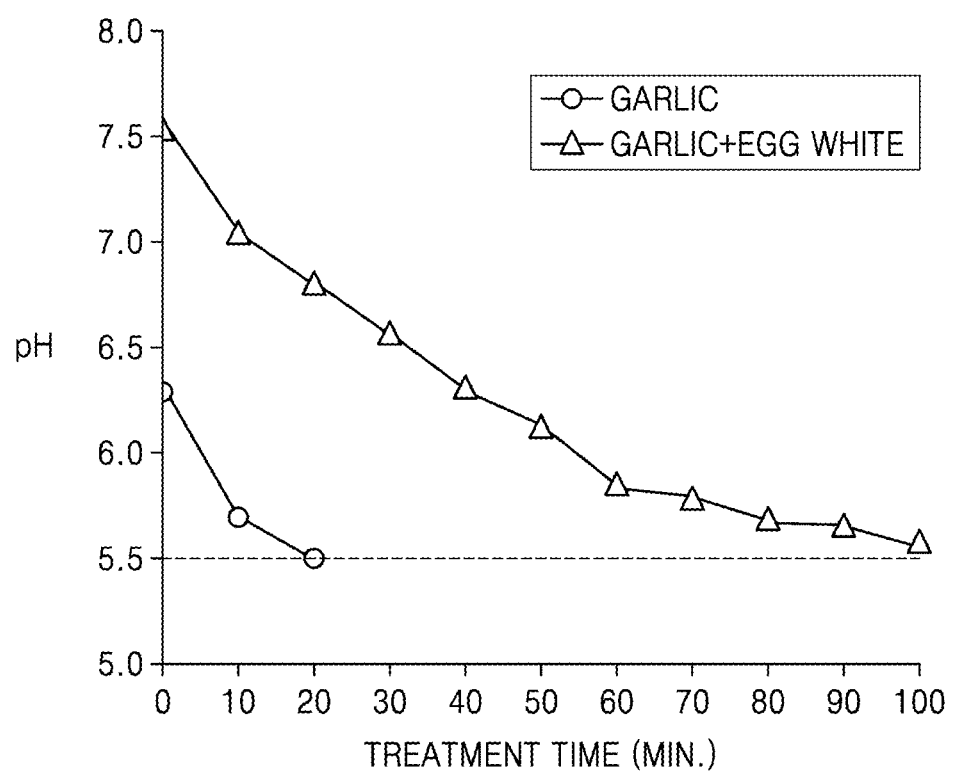
FIG. 2 shows pH change of a garlic treatment group and a garlic+egg white treatment group according to plasma treatment.

As shown in FIG. 2, the pHs of the garlic treatment group and the garlic+egg white treatment group before the plasma treatment were 6.39 and 7.54, respectively, and which showed a tendency of decreasing the pHs according to the increase in the plasma treatment time as the same in the onion groups. The time for the pH of the garlic and garlic+egg white treatment groups reached 5.5 was confirmed as 20 minutes for the garlic treatment group and 102.5 minutes for the garlic+egg white treatment group.

Experiment Example 2

Verification of Residual Nitrite Amount of Plasma Treatment Group

In order to verify amounts of residual nitrite in the plasma treatment groups, the residual nitrite amounts were measured as follows.

After homogenizing 1 g of sample and 30 mL of distilled water (T25 digital ULTRA-TURRAX®, Ika Co.), the resultant was heated in a constant-temperature water bath at 80° C. for 20 minutes. The heated sample was cooled at room temperature for 30 minutes, and centrifuged for 5 minutes at 300×g (UNION 32R, Hanil Science Industrial,Co., Ltd., Incheon, Korea). The centrifuged sample was filtered in a 50 mL volumetric flask using a filter paper (No. 4, Whatman PLC., Kent, UK), and distilled water was added thereto to prepare a test solution. 10 mL of the test solution was taken and mixed with 2.5 mL of sulfanilamide solution to prepare a mixture, and then 2.5 mL of naphthyl ethylenediamine solution and distilled water were added to the mixture until the total volume was 50 ml and allowed for the color-development. Thereafter, the mixture was remained for 20 minutes and then absorbance of the resultant was measured at 540 nm, and a residual nitrite amount was calculated according to the calibration curve of the standard solution prepared in advance.

Figure 3:
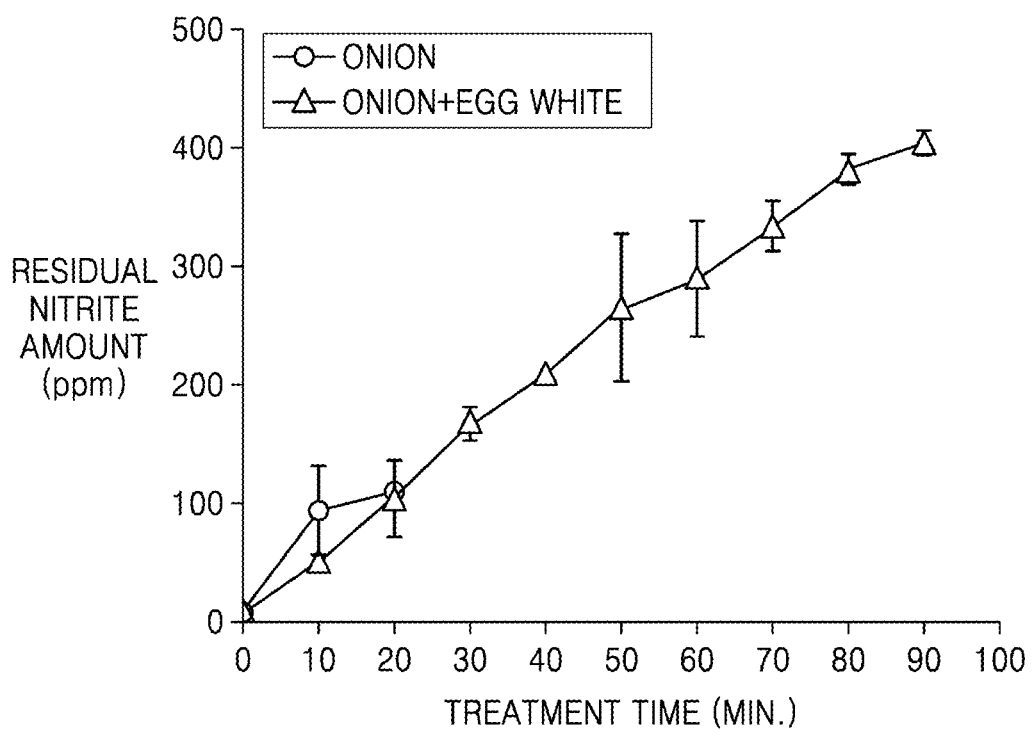
FIG. 3 shows residual nitrite content change of an onion treatment group and an onion+egg white treatment group according to plasma treatment.

As shown in FIG. 3, the residual nitrite amounts of the onion treatment group and the onion+egg white treatment group before the atmospheric pressure plasma treatment were 7.10 ppm and 6.11 ppm, respectively, and the residual nitrite amounts of the treatment groups after completion of the plasma treatment were 110.88 ppm and 403.74 ppm, respectively. The difference in the nitrite amount between the treatment groups was due to the increase in the amount of nitrite ions produced as the total plasma treatment time increased in the egg white-added group.

Figure 4:
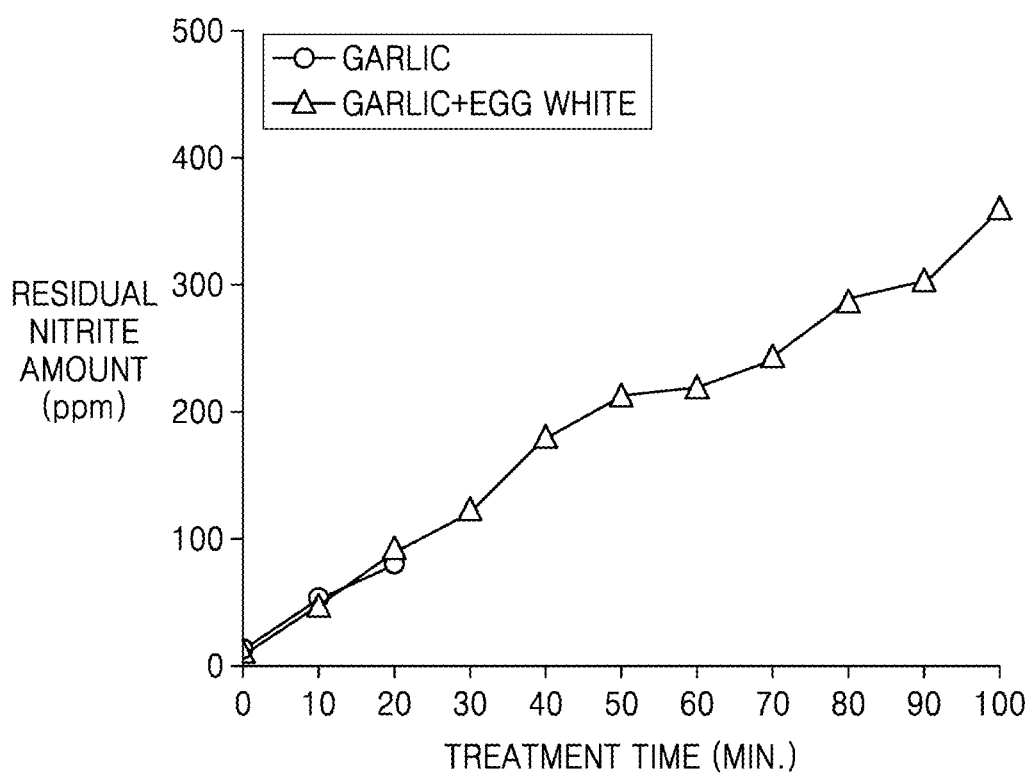
FIG. 4 shows residual nitrite content change of a garlic treatment group and a garlic+egg white treatment group both treated according to plasma treatment.

As shown in FIG. 4, the garlic treatment group and the garlic+egg white treatment group had a tendency of increasing the residual nitrite amounts as the plasma treatment time increased. The residual nitrite amounts of the garlic treatment group and the garlic+egg white treatment group before the plasma treatment were 13 ppm and 11 ppm, respectively, and the residual nitrite amounts of the treatment groups after completion of the plasma treatment reached 80 ppm and 360 ppm, respectively.

Experiment Example 3

Verification of Residual Nitrite Amount of Powdered Plasma Treatment Groups after Lyophilization Residual nitrite amounts of the powdered plasma treatment groups after lyophilization were measured in the same manner as in Experiment Example 2 to verify the amounts.

Figure 5:
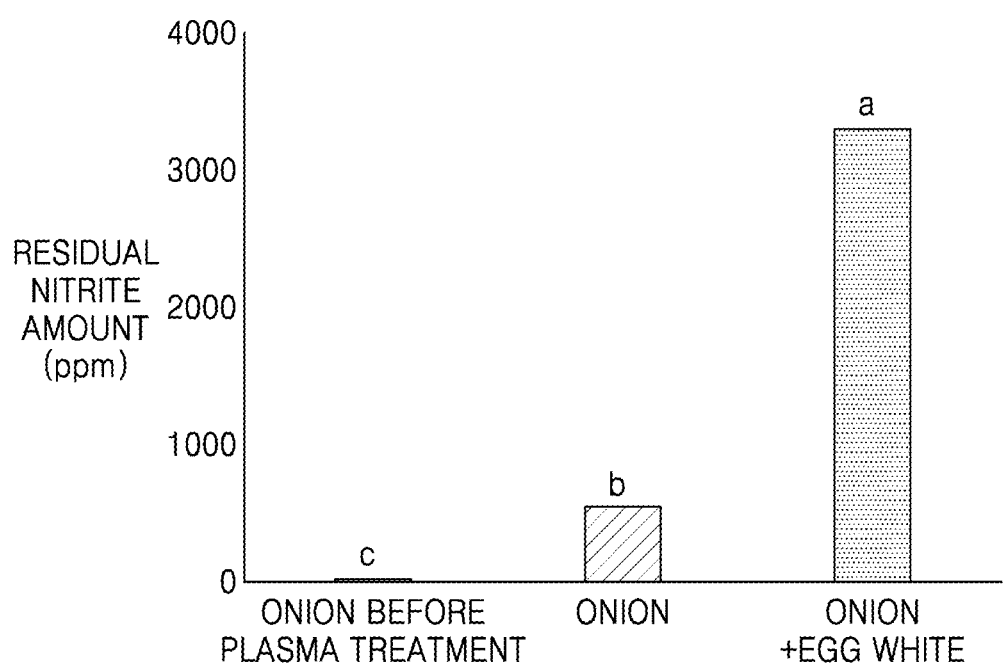
FIGS. 5 and 6 show the results of comparing residual nitrite contents after pulverizing each of the treatment groups.

As shown in FIG. 5, a residual nitrite amount of the onion group not treated with plasma was 10.71 ppm, which was the lowest nitrite amount of among those of all the treated groups. The nitrite amounts of the onion treatment group and the onion+egg white treatment group were 447.19 ppm and 2692.92 ppm, respectively, where the nitrite amount of the onion+egg white treatment group was 6 times or higher than that of the onion treatment group not added with egg white.

Figure 6:
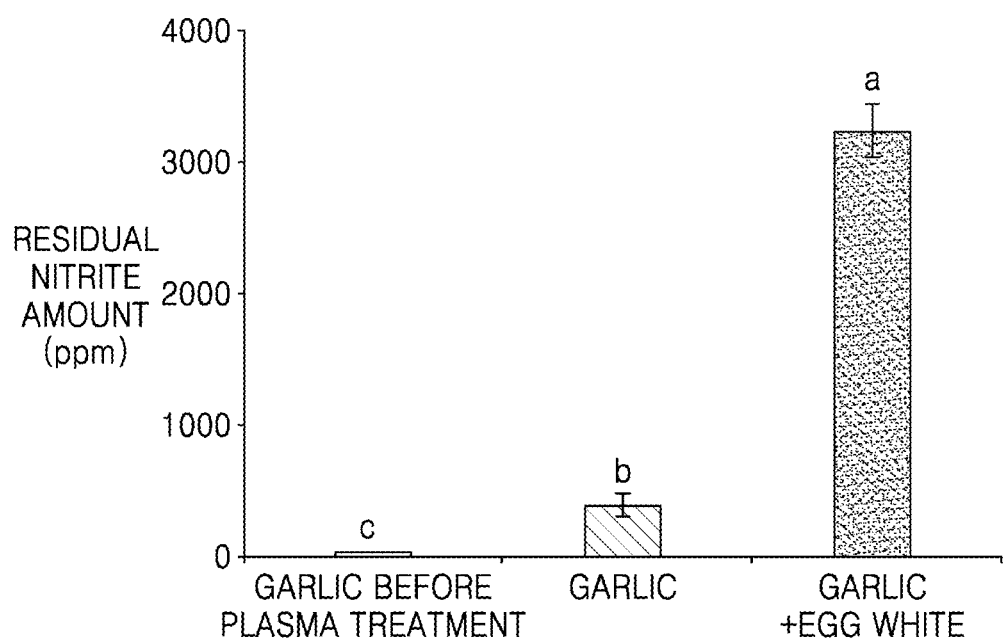

As shown in FIG. 6, the residual nitrite amount in the garlic group before the plasma treatment was 35.1 ppm, and the residual nitrite amounts of the garlic treatment group and the garlic+egg white treatment group were increased to 395.91 ppm and 3250.08 ppm, respectively, as significantly increased compared to that of the control.

Experiment Example 4

Verification of Residual Nitrite Amount of Food

Residual nitrite amounts of the completed foods were measured in the same manner as in Experiment Example 2 to verify the amounts. The residual nitrite amounts were measured from the negative control of Preparation Example, a food added with the onion treatment group, a food added with the onion+egg white treatment group, and a positive group.

Figure 7:
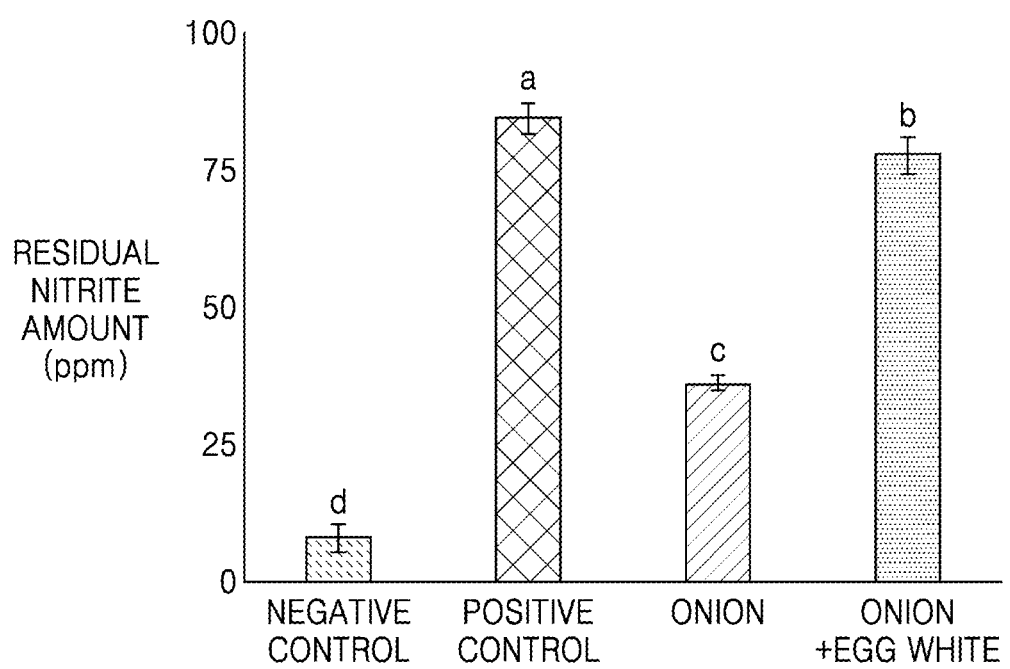
FIG. 7 shows the result of comparing residual nitrite contents in final food products.

As shown in FIG. 7, the residual nitrite amount of the positive group appeared to be as significantly high as about 83.77 ppm, and the residual nitrite amount of the food added with the onion+egg white treatment group was 77.10 ppm, which was slightly lower than that of the positive control. The residual nitrite amounts of the food added with the onion treatment group and the negative control were 35.70 ppm and 7.80 ppm, respectively, which were significantly lower than those of two following sausages.

Experiment Example 5

Verification of Chromaticity of Food

In order to verify chromaticity of the completed foods, the color degree was measured as follows.

A surface of the central part of a cross-section of the completed sausage was measured using a spectrophotometer (CM-5, Konica Minolta Sensing Inc., Osaka, Japan), and after standardizing with a standard blackboard and a standard whiteboard, lightness (L*-value), redness (a*-value), and yellowness (b*-value) were measured.

Figure 8:
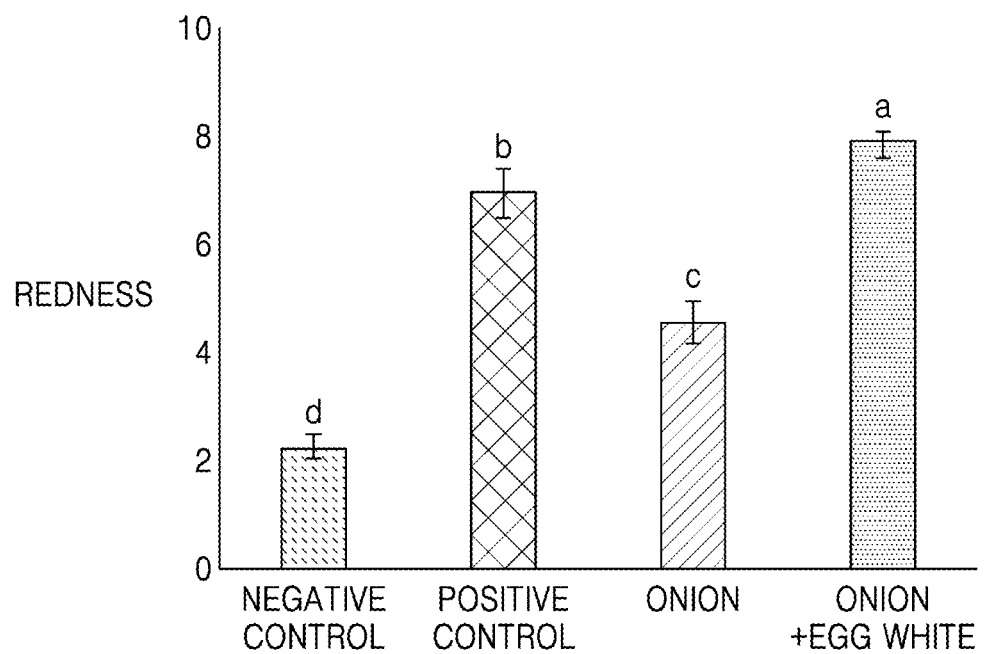
FIG. 8 shows the result of comparing degrees of redness of final food products.

As shown in FIG. 8, the food added with the onion+egg white treatment group exhibited significantly high redness as compared to foods added with all other treatment groups, which was followed by the positive control, the food added with the onion treatment group, and the negative group in terms of exhibiting high degree of redness in the stated order.

Also, as shown in FIG. 9, it could be confirmed with the naked eye that the food added with the onion+egg white treatment group showed a darker color of salted meat as compared to the food added with the onion treatment group. Referring to FIGS. 8 and 9, it was confirmed that when egg white, which is a natural pH buffer material, is added to onion with a plasma treatment powder in preparation of food as a nitrite substitute, the color development of the food was at a level similar to that of a dyed meat color added with a synthetic nitrite.

Experiment Example 6

Verification of Organoleptic Properties of Food

The results of evaluating organoleptic properties such as appearance and flavors of the foods are shown in Table 1. In regard of the redness, it was evaluated that the positive group and the food added with the onion+egg white treatment group were most red, and there was no significant difference between the two foods. In this regard, it may be confirmed that when the onion+egg white powder is used with the plasma treatment, the salted meat color of sausage is expressed at the level of the positive control.

TABLE 1

|  | Control | Positive control | Onion | Onion + egg white | SEM[2] |
|---|---|---|---|---|---|
| Appearance characteristics |  |  |  |  |  |
| Color (redness) | 3.73[b] | 6.45[a] | 3.63[b] | 6.23[a] | 0.084 |
| Firmness | 5.30 | 5.13 | 4.17 | 5.37 | 0.330 |
| Flavor characteristics |  |  |  |  |  |
| Warmed-over flavor | 3.60[a] | 2.60[ab] | 2.40[b] | 2.00[b] | 0.224 |
| Onion flavor | 1.27[c] | 1.83[c] | 5.81[a] | 4.77[b] | 0.196 |
| Egg flavor | 1.83 | 2.27 | 1.93 | 1.97 | 0.267 |

Sausages were scored within 9 points: Redness (1: light gray, 9: red), Gloss (1: no gloss, 9: glossy), Hardness (1: soft, 9: hard), Warmed-over flavor (1: weak, 9: strong), Onion flavor and egg flavor (1: weak 9: strong)[2] Standard error of the sample mean distribution: n=12[a-c] Different letters in the same line denote significant differences (P<0.05).

As a result of the flavor evaluation, it was confirmed that not only the control and positive control had relatively strong warmed-over flavor but foods added with the onion treated group and foods added with the onion+egg white treated group also had onion flavor. In this regard, when a nitrite substitute including an onion+egg white powder is used, it is expected that the nitrite substituted may replace a synthetic nitrite and exhibit effects such as expressing meat color and suppressing rancidity, and thus may be familiar to domestic consumers who prefer onion flavor. There was no off-flavor such as egg odor.

The invention claimed is:

1. A nitrite substitute comprising a plasma-treated mixture of vegetables and egg white.

2. The nitrite substitute of claim 1, wherein a weight ratio of vegetables and egg white in the mixture is in a range of about 10:1 to about 1:1.

3. The nitrite substitute of claim 1, wherein a strength of the plasma treatment is in a range of about 0.1 W to about 5 W.

4. The nitrite substitute of claim 1, wherein the plasma treatment is performed for about 10 minutes to about 100 minutes.

5. The nitrite substitute of claim 1, wherein the plasma treatment is performed until a pH is in a range of about 5 to about 6.

6. A food comprising the nitrite substitute of claim 1.

7. The food of claim 6, wherein an amount of the nitrite substitute based on a weight of the food is in a range of about 1 weight % to about 15 weight %.

8. The food of claim 6, wherein the food is synthetic-nitrite-free food.

9. The food of claim 6, wherein the food comprises processed meat products, packaged meat, processed fish products, and processed seafood products.

10. A method of preparing a food, the method comprising mixing the nitrite substitute of claim 1 with raw materials of a food to prepare a food emulsion.

* * * * *